United States Patent
Kim et al.

(10) Patent No.: US 12,037,751 B1
(45) Date of Patent: Jul. 16, 2024

(54) ARTIFICIAL TURF FILLING MATERIAL HAVING ANTIBACTERIAL AND COOLING EFFECT

(71) Applicant: Bong Jin Kim, Incheon (KR)

(72) Inventors: Bong Jin Kim, Incheon (KR); Soo Hyoung Kim, Gyeongsangbuk-do (KR)

(73) Assignee: Bong Jin Kim, Incheon (KR)

(*) Notice: Subject to any disclaimer, the term of this patent is extended or adjusted under 35 U.S.C. 154(b) by 0 days.

(21) Appl. No.: 18/244,379

(22) Filed: Sep. 11, 2023

(51) Int. Cl.
| | |
|---|---|
| E01C 13/08 | (2006.01) |
| B05D 1/12 | (2006.01) |
| B05D 7/02 | (2006.01) |
| C08K 3/04 | (2006.01) |
| C08K 3/26 | (2006.01) |
| C08K 3/30 | (2006.01) |
| C08K 3/34 | (2006.01) |
| C08L 9/06 | (2006.01) |
| C08L 23/06 | (2006.01) |
| C08L 23/12 | (2006.01) |
| C08L 25/08 | (2006.01) |
| C08L 91/00 | (2006.01) |

(52) U.S. Cl.
CPC .............. *E01C 13/08* (2013.01); *B05D 1/12* (2013.01); *B05D 7/02* (2013.01); *C08K 3/04* (2013.01); *C08K 3/26* (2013.01); *C08K 3/30* (2013.01); *C08K 3/346* (2013.01); *C08L 9/06* (2013.01); *C08L 23/06* (2013.01); *C08L 23/12* (2013.01); *C08L 25/08* (2013.01); *C08L 91/00* (2013.01); *B05D 2201/02* (2013.01); *B05D 2601/28* (2013.01); *C08K 2003/265* (2013.01); *C08K 2003/3009* (2013.01)

(58) Field of Classification Search
CPC . E01C 13/08; C08K 2003/3009; C08K 3/346; C08L 9/06; C08L 25/04–14; C08L 23/00–44; C09D 133/00–26
See application file for complete search history.

(56) References Cited

U.S. PATENT DOCUMENTS

2012/0258811 A1* 10/2012 Tetrault .............. C08J 3/24
252/78.3

FOREIGN PATENT DOCUMENTS

| KR | 102055556 | 12/2019 |
| KR | 102301119 B1 * | 9/2021 |

OTHER PUBLICATIONS

Partial machine translation of KR-102301119-B1 (2021).*

* cited by examiner

*Primary Examiner* — Kregg T Brooks
(74) *Attorney, Agent, or Firm* — IPLA P.A.

(57) ABSTRACT

A filling material that is laid between artificial turf when constructing artificial turf on a floor of sports stadium or the like, specifically, an antibacterial artificial turf filling material comprising 20 to 35% by weight of a styrene-based polymer, 8 to 20% by weight of an olefin-based resin, 15 to 30% by weight of a process oil, 10 to 30% by weight of an inorganic filling material, and 2.1 to 8% by weight of an antibacterial powder, wherein the antibacterial powder is a mixed powder of a copper sulfide powder and a red clay powder, the antibacterial artificial turf filling material has by a specific heat of 1.80 J/g·k or more.

8 Claims, 4 Drawing Sheets

FIG. 1

Contents of filling materials for artificial turf (based on 100% by weight of filling material)

| Item | Styrene-based polymer (SEBS) | Olefin-based polymer (PP) | Process oil | Inorganic filling material (CaCO$_3$) | Copper sulfide powder | Red clay powder | Compatibilizer (Maleic acid anhydride) | Color masterbatch | Anti-aging agent |
|---|---|---|---|---|---|---|---|---|---|
| Example 1 | 28 | 10 | 25 | 22 | 1.5 | 3.5 | 4 | 3 | 3 |
| Example 2 | 28 | 10 | 25 | 20 | 2.5 | 4.5 | 4 | 3 | 3 |
| Example 3 | 28 | 10 | 25 | 24 | 0.5 | 2.5 | 4 | 3 | 3 |
| Example 4 | 28 | 10 | 25 | 24.8 | 0.1 | 2.1 | 4 | 3 | 3 |
| Example 5 | 28 | 10 | 25 | 20 | 1.5 | 5.5 | 4 | 3 | 3 |
| Example 6 | 28 | 10 | 25 | 20 | 3.5 | 3.5 | 4 | 3 | 3 |
| Example 7 | 28 | 10 | 25 | 20 | 7 | 0 | 4 | 3 | 3 |
| Example 8 | 28 | 10 | 25 | 20 | 0 | 7 | 4 | 3 | 3 |
| Example 9 | 28 | 10 | 25 | 24.9 | 0.05 | 2.05 | 4 | 3 | 3 |
| Example 10 | 28 | 10 | 25 | 19 | 3 | 5 | 4 | 3 | 3 |
| Comparative Example | 28 | 10 | 25 | 27 | 0 | 0 | 4 | 3 | 3 |

FIG. 2

| Item | Specific heat (J/g·k) | Wear resistance (LISPORT, 20,000 times) | |
|---|---|---|---|
| | | Shock absorption (%) | Durability (Change of outer appearance of filling material) |
| Example 1 | 1.83 | 38 | Good |
| Example 2 | 1.85 | 37 | Good |
| Example 3 | 1.86 | 37 | Good |
| Example 4 | 1.81 | 38 | Good |
| Example 5 | 2.14 | 35 | Good |
| Example 6 | 1.86 | 35 | Good |
| Example 7 | 1.35 | 34 | Dust generated |
| Example 8 | 2.26 | 34 | Good |
| Example 9 | 1.65 | 37 | Good |
| Example 10 | 1.94 | 34 | Good |
| Comparative Example | 1.67 | 33 | Dust generated |

FIG. 3

| Item | Escherichia coli (Escherichia coli ATCC 8739) | | Staphylococcus aureus (Staphylococcus aureus ATCC 6538) | |
|---|---|---|---|---|
| | Initially (CUF/ml) | 18 hours later (CUF/ml) | Initially (CUF/ml) | 18 hours later (CUF/ml) |
| Example 1 | $2.4*10^5$ | < 10 | $3.2*10^5$ | < 10 |
| Example 2 | $2.3*10^5$ | < 10 | $3.2*10^5$ | < 10 |
| Example 3 | $2.4*10^5$ | < 10 | $3.2*10^5$ | < 10 |
| Example 4 | $2.3*10^5$ | < 10 | $3.2*10^5$ | < 10 |
| Example 5 | $2.4*10^5$ | < 10 | $3.2*10^5$ | < 10 |
| Example 6 | $2.4*10^5$ | < 10 | $3.2*10^5$ | < 10 |
| Example 7 | $2.4*10^5$ | < 10 | $3.2*10^5$ | < 10 |
| Example 8 | $2.3*10^5$ | $1.6*10^3$ | $3.2*10^5$ | $2.1*10^3$ |
| Example 9 | $2.4*10^5$ | $1.4*10^2$ | $3.2*10^5$ | $1.7*10^2$ |
| Example 10 | $2.4*10^5$ | < 10 | $3.2*10^5$ | < 10 |
| Comparative Example | $2.4*10^5$ | $2.4*10^5$ | $3.2*10^5$ | $3.2*10^5$ |

|  | Artificial turf filling material | | |
|---|---|---|---|
|  | pcm-aluminum | | |
|  | 5% | 10% | 20% |
| Thermal conductivity(W/m.oC) A | 0.04634 | 0.04812 | 0.04882 |
| Instantaneous maximum flow rate(J/cm2.sec) A | 0.15 | 0.153 | 0.156 |
|  | pcm-titanum | | |
|  | 5% | 10% | 20% |
| Thermal conductivity(W/m.oC) T | 0.04717 | 0.04762 | 0.04907 |
| Instantaneous maximum flow rate(J/cm2.sec) T | 0.148 | 0.153 | 0.161 |
|  | pcm-graphene | | |
|  | 5% | 10% | 20% |
| Thermal conductivity(W/m.oC) G | 0.04672 | 0.04837 | 0.05133 |
| Instantaneous maximum flow rate(J/cm2.sec) G | 0.147 | 0.15 | 0.156 |

ARTIFICIAL TURF FILLING MATERIAL HAVING ANTIBACTERIAL AND COOLING EFFECT

BACKGROUND

The present invention relates to a filling material that is laid between artificial turf when constructing artificial turf on a floor of sports stadium or the like, and that is configured to have antibacterial properties for inhibiting bacterial growth together with a cooling effect.

DESCRIPTION OF THE RELATED ART

In an artificial turf system, a certain amount of silica sand and synthetic rubber filling material are usually filled between artificial turf pile yarns to achieve safety that is similar to natural turf, such as shock absorption and rolling resistance, and constant sports interactions with a ball.

Conventionally, as filling materials for artificial turf, recycled soft plastics, hard carbon and plasticizers, or, instead of recycled soft plastics, thermosetting elastomers such as EPDM, elastomers such as waste tire powder, or thermoplastic rubbers such as styrene-ethylene-butadiene-styrene (hereinafter referred to as SEBS) were used. Since artificial turf has the advantage of convenient maintenance, which natural grass is lacking, it is used in sports fields such as soccer fields and baseball fields, and is also used as greens of golf courses, which raise environmental problems.

However, there was a problem that during the period of using artificial turf, various types of bacteria proliferated due to various bacteria-generated impurities introduced from outside. Efforts have been made to solve the problem described above by forming filling materials for artificial turf by using various materials, but the problem of bacterial growth has not been solved yet.

In addition, in hot summer, artificial turf is not very efficient in dissipating or reflecting solar heat and it stores heat, and so people who exercise or engage in activities on artificial turf feel heat significantly. Especially when their skin comes into contact with a filling material as well as artificial turf, they not only feel extreme heat but also discomfort, and severe friction and contact may cause even burns to the skin. Therefore, a countermeasure is required in this regard.

Patent Registration No. 10-2055556 (Dec. 9, 2019)

SUMMARY OF THE INVENTION

The problem that the present invention aims to solve is to provide an artificial turf filling material that has antibacterial properties to inhibit bacterial growth and is provided with a cooling function as well to resolve health concerns caused by bacteria and ensure pleasant and safe activities with a cooling sensation for people who perform activities and exercise on artificial turf.

The present invention to solve the problem described above is an antibacterial artificial turf filling material comprising 20 to 35% by weight of a styrene-based polymer, 8 to 20% by weight of an olefin-based resin, 15 to 30% by weight of a process oil, 10 to 30% by weight of an inorganic filling material, and 2.1 to 8% by weight of an antibacterial powder, wherein the antibacterial powder is a mixed powder of a copper sulfide powder and a red clay powder, and the antibacterial artificial turf filling material has by a specific heat of 1.80 J/g·k or more.

In addition, the artificial turf filling material having antibacterial properties is coated to have a cooling function, and a PCM (phase change material) powder is prepared so that the particle size of the power is 20 to 30 μm, and titanium, aluminum, and graphene powders are prepared as a cooling material powder so that the particle size of the powers is 20 to 30 μm, wherein one or more powders of titanium, aluminum, and graphene are mixed with the PCM power, and a binder is prepared to be coated on the artificial turf filling material with viscosity for adhesion, and wherein an eco-friendly acrylic binder is mixed as a binder to prepare a solution, and the solution is supplied to a spraying machine to coat an outer surface of the artificial turf filling material with the solution The present invention may provide an artificial turf filling material that has excellent durability and at the same time exhibits an excellent antibacterial effect by comprising a specific content of a styrene-based polymer, an olefin-based resin, a process oil, an inorganic filing material, and an antibacterial powder.

In addition, the present invention allows an artificial turf filling material to exhibit a cooling effect by mixing and coating materials such as PCM, titanium, aluminum, and graphene, thereby providing an artificial turf environment in which users can perform activities while feeling pleasant and cool even in summer.

DETAILED DESCRIPTION OF THE EMBODIMENTS

Hereinafter, specific embodiments of the present invention will be described in more detail so that those skilled in the art may easily implement the present invention. However, the present invention may be embodied in many different forms and is not limited to the embodiments described herein.

The present invention is an antibacterial artificial turf filling material comprising 10 to 40% by weight of a styrene-based polymer, 5 to 30% by weight of an olefin-based resin, 5 to 35% by weight of a process oil, 5 to 40% by weight of an inorganic filling material, and 0.1 to 10% by weight of an antibacterial powder.

In the present invention, the styrene-based polymer imparts elasticity and elastic recovery to a filling material and thus functions as an elastic polymer in a filling material of the present invention. In addition, the styrene-based polymer may be one or more selected from the group consisting of styrene-ethylene-butadiene-styrene copolymer (SEBS), styrene-butadiene-styrene copolymer (SBS), styrene-ethylene-propylene-styrene copolymer (SEPS), hydrogenated styrene-isoprene-butadiene (SEEPS), and styrene-isoprene-styrene copolymer (SIS), and preferably, a styrene-ethylene-butadiene-styrene copolymer (SEBS).

The styrene-ethylene-butadiene-styrene (SEBS) is a material that is capable of realizing physical properties that are most similar to natural rubber, and it absorbs a process oil and has compatibility with an olefin-based resin.

Specifically, the styrene-ethylene-butadiene-styrene (SEBS) imparts elasticity and elastic recovery, and since it itself is a block structure, it plays a role of preventing crosslinking during compounding. The styrene-ethylene-butadiene-styrene (SEBS) is a three-dimensional structure consisting of ethylene-butadiene soft segments connected between styrene hard segments and moderate segments at both ends. The styrene-ethylene-butadiene-styrene (SEBS) has a two-phase structure in which hard segments and soft segments are phase-separated. A styrene hard segment is a crystalline region that is immiscible with a non-crystalline amorphous ethylene-butadiene soft segment, forms physical crosslinks at room temperature, imparts mechanical properties (e.g., tensile strength), and has a glass transition temperature (Tg) of about 100° C. An ethylene-butadiene soft segment is a hydrophobic non-crystalline region that absorbs an process oil and has a glass transition temperature (Tg) of approximately −55° C. Phase separation between a styrene hard segment and an ethylene-butadiene soft segment is caused by different solubility parameters (styrene: −91, ethylene-butadiene: −776), and since the degree of phase separation affects mechanical properties, rheological properties, heat resistance, and the like, a large degree of phase separation has an advantage.

The content of the styrene-based polymer is 10 to 40% by weight, preferably 20 to 35% by weight, based on 100% by weight of the filling material. When the content of the styrene-based polymer is less than 10% by weight, elasticity, wear resistance, durability, and the like may be reduced, and when it exceeds 40% by weight, improvement of performance compared to the manufacturing cost is hardly expected.

In the present invention, the olefin-based resin functions as a curable polymer that determines the hardness of a filling material. In addition, the olefin-based polymer may be an ethylene-based resin, a propylene-based resin, or a mixed resin thereof. The olefin-based resin applied to the present invention is one of curable polymers that determine hardness and is used to impart light resistance, flowability, internal resistance, and mechanical properties to a filling material.

The polyethylene resin comprises a low density polyethylene resin manufactured by a high pressure method, an ethylene homopolymer manufactured by a medium-low pressure method or low-density, medium-density, and high-density polyethylene resins, which are copolymers of ethylene and -olefin. The propylene-based resin comprises a propylene homopolymer as well as copolymer resins containing propylene as a main component such as a propylene-ethylene random copolymer and a propylene-ethylene block copolymer.

To satisfy the A-1 grade of the artificial turf system quality standard according to the Artificial Turf KS M 3888-1:2013 System Quality Standard, the content of the olefin-based resin is 5 to 30% by weight, preferably 8 to 20% by weight, based on 100% by weight of the filling material. When the content of the olefin-based resin is less than 5% by weight, the hardness of a filling material is low and so the durability may be reduced, and when it exceeds 30% by weight, a filling material lacks soft elasticity and becomes hard and so shock absorption, which is safety performance, may be reduced.

In the present invention, the process oil is added to ensure processability during high-temperature extrusion and to ensure mixing uniformity between raw materials. The process oil may be one or more selected from the group consisting of paraffin-based, naphthene-based, and aromatic-based process oils.

The paraffin-based oil improves the flow and color stability of a filling material. However, when it is used more than a proper input amount, a durability problem (deformation) may occur, and when it is exposed outdoors for a long time, shape distortion and clumping may occur due to oil bleeding or the like, and a fatal problem in heat resistance may be caused.

The content of the process oil is 5 to 35% by weight, preferably 15 to 30% by weight, based on 100% by weight of the filling material. When the content of the process oil content is less than 5% by weight, a processing problem may occur due to poor flowability, and when it exceeds 35% by weight, a problem of oil bleeding may occur.

In the present invention, an inorganic filling material is added to ensure stability of a filling material, increase oil absorbency, and perform an appropriate elastic function, and may be one or more selected from the group consisting of calcium carbonate, activated carbon, and mica.

The content of the inorganic filling material is 5 to 40% by weight, preferably 10 to 30% by weight, based on 100% by weight of the filling material.

When the inorganic filling material content is less than 5% by weight, physical properties such as tensile strength and durability may be reduced, and when it exceeds 40% by weight, achieving desired performance of an inorganic material such as wear resistance, deformation, and elasticity becomes difficult.

In the present invention, the antibacterial powder is added to impart an antibacterial effect to a filling material, and may have a particle size of 0.5 to 50 µm, preferably 1.5 to 20 µm. When the particle size is less than 0.5 µm, controlling during a milling process may be difficult, and when it exceeds 50 µm, a product surface may not be smooth.

The content of the antibacterial powder is 0.1 to 10% by weight, preferably 2.1 to 8% by weight, based on 100% by weight of the filling material.

When the content of the antibacterial powder is less than 0.1% by weight, an antibacterial effect may be negligible, and when it exceeds 10% by weight, improvement of an antibacterial effect may be negligible compared to the manufacturing cost.

In the present invention, the antibacterial powder may be a copper powder, a red clay powder, or a mixed powder thereof, and preferably a mixed powder.

The copper powder may be prepared through a method known in the art. For example, it may be prepared as a powder through a process of wet milling, drying, dry milling, and sieving. The copper powder may be copper sulfide, copper oxide, or a mixture thereof, and is preferably a copper sulfide powder. The copper oxide or copper sulfide is an antibacterial metal, which is capable of imparting to the filling material an excellent antibacterial effect in addition to conductivity, and it may also inhibit growth of bacteria themselves so that an excellent deodorizing effect may be obtained.

The copper (I) sulfide is also referred to as cuprous sulfide, and a chemical formula thereof is $Cu_2S$ and a formula weight thereof is 159.15. It may be obtained by heating copper with a hydrogen/hydrogen sulfide mixed gas or by heating copper (II) sulfide with a small amount of sulfur in hydrogen gas. Naturally, it is obtained from chalcocite.

Copper (II) sulfide is also referred to as cupric sulfide, and a chemical formula thereof is CuS and a formula weight thereof is 95.61.

The red clay emits far-infrared rays to improve the antibacterial properties of copper, has low thermal conductivity to lower the surface temperature of a filling material, and improves bonding between filling materials to suppress dust generation.

The mixed powder of copper and red clay may consist of 3 to 70% by weight of a copper powder and 30 to 97% by weight of a red clay powder. When the content of the copper sulfide powder is less than 3% by weight compared to 100% by weight of a mixed powder, an antibacterial effect may be reduced, and when it exceeds 97% by weight, the specific heat of a filling material may be lowered to reduce temperature-lowering efficacy.

In the present invention, the filling material may further comprise one or more selected from the group consisting of a compatibilizer, an anti-aging agent, an antioxidant, a color masterbatch, and a flame retardant, each of which may be included in 0.1 to 10% by weight, preferably 0.5 to 5% by weight, based on 100% by weight of the filling material. The types of the compatibilizer, anti-aging agent, antioxidant, color masterbatch, and flame retardant are not particularly limited, and common ones may be used.

In the present invention, the filling material may have a particle size of 1.4 to 3.35 mm in average diameter, and when the size of the filling material is less than 1.4 mm, the efficacy as a filling material is reduced and the cushioning effect is not expressed, and thus joints such as knees may be easily damaged during exercise and the surface may be slippery.

In the present invention, the filling material may have a specific heat of 1.80 J/g·k or more, preferably 1.80 to 2.20 J/g·k. When the specific heat is less than 1.80 J/g·k, temperature-lowering efficacy may be reduced, and when it exceeds 2.20 J/g·k, an antibacterial effect may be reduced.

In addition, in the present invention, the filling material is formed in a cylindrical shape and in a uniform size so that dust caused by mechanical friction is not generated, the coefficient of friction is also smaller, and elasticity may be increased.

Hereinafter, a method for manufacturing a filling material according to the present invention will be described.

A filling material according to the present invention is manufactured by steps of: (a) mixing an olefin-based resin, a process oil, a compatibilizer, and an antibacterial powder to prepare a first mixture; (b) mixing a styrene-based polymer, an olefin-based resin, a process oil, an inorganic filling material, and the first mixture, melting and extruding the resulting mixture in an extruder to manufacture a filling material; and (c) cutting the filling material into a certain shape underwater to manufacture a granular filling material.

The step (a) is a step of dispersing an antibacterial powder to facilitate mixing, wherein after melting an olefin-based resin, a process oil, a compatibilizer, and an antibacterial powder may be mixed, and the mixing may be performed at 180 to 240° C. When the temperature during the mixing is less than 180° C., an olefin-based resin may not melt and thus mixing may not be easy, and when it exceeds 240° C., the temperature may be too high and thus an olefin-based resin may burn.

The step (b) is a step for kneading main raw materials, wherein one or more selected from the group consisting of anti-aging agent, antioxidant, color masterbatch, and flame retardant may be further mixed.

After mixing and melting the styrene-based polymer and the olefin-based resin, a process oil, an inorganic filling material, and the first mixture may be mixed, and the mixing may be performed at 200 to 240° C. When the temperature during the mixing and extruding is less than 200° C., a styrene-based polymer and an olefin-based resin may not melt and thus mixing and extruding may not be easy, and when it exceeds 240° C., the temperature may be too high and a styrene-based polymer and an olefin-based resin may burn.

Thereafter, the extruded filling material may be cut into a certain shape underwater to manufacture a granular filling material.

Hereinafter, specific embodiments according to the present invention will be described.

Example 1

Based on 100% by weight of a filling material, 5% by weight of polypropylene was added to a mixer and preheated at 200° C. for 10 minutes to melt polypropylene.

Then, 4% by weight of maleic anhydride, 10% by weight of a process oil (paraffin-based oil), and 5% by weight of an antibacterial powder with a particle size of 5 μm (1.5% by weight of a copper sulfide powder and 3.5% by weight of a red clay powder) were added to the molten polypropylene, stirred, and mixed to prepare a first mixture.

Thereafter, based on 100% by weight of a filling material, 28% by weight of styrene-ethylene-butadiene-styrene (SEBS), 5% by weight of polypropylene, 15% by weight of a process oil (paraffin-based oil), 22% by weight of calcium carbonate ($CaCO_3$), 3% by weight of a green masterbatch, 3% by weight of an anti-aging agent (TINUVIN405), and the first mixture were added to a mixer, mixed at 220° C., and subjected to extrusion at 220° C. by using an extruder. Simultaneously with the extrusion, the extruded mixture was cooled with air and cut into pieces in a size of a diameter of 1.4 to 3.35 mm to manufacture a filling material of a cylindrical shape for artificial turf.

Example 2

A filling material for artificial turf was manufactured by the same method as Example 1, except that 20% by weight of an inorganic filling material and 7% by weight of an antibacterial powder (2.5% by weight of a copper sulfide powder and 4.5% by weight of a red clay powder) were added in Example 1.

Example 3

A filling material for artificial turf was manufactured by the same method as Example 1, except that 24% by weight of an inorganic filling material and 3% by weight of an antibacterial powder (0.5% by weight of a copper sulfide powder and 2.5% by weight of a red clay powder) were added in Example 1.

Example 4

A filling material for artificial turf was manufactured by the same method as Example 1, except that 24.8% by weight of an inorganic filling material and 2.2% by weight of an antibacterial powder (0.1% by weight of a copper sulfide powder and 2.1% by weight of a red clay powder) were added in Example 1.

Example 5

A filling material for artificial turf was manufactured by the same method as Example 1, except that 20% by weight of an inorganic filling material and 7% by weight of an antibacterial powder (1.5% by weight of a copper sulfide powder and 5.5% by weight of a red clay powder) were added in Example 1.

Example 6

A filling material for artificial turf was manufactured by the same method as Example 1, except that 20% by weight of an inorganic filling material and 7% by weight of an antibacterial powder (3.5% by weight of a copper sulfide powder and 3.5% by weight of a red clay powder) were added in Example 1.

Example 7

A filling material for artificial turf was manufactured by the same method as Example 1, except that 7% by weight of an antibacterial powder was made of a copper sulfide powder in Example 1.

Example 8

A filling material for artificial turf was manufactured by the same method as Example 1, except that 78 by weight of an antibacterial powder was made of a red clay powder in Example 1.

Example 9

A filling material for artificial turf was manufactured by the same method as Example 1, except that 24.9% by weight of an inorganic filling material and 2.1% by weight of an antibacterial powder (0.05% by weight of a copper sulfide powder and 2.05% by weight of a red clay powder) were added in Example 1.

Example 10

A filling material for artificial turf was manufactured by the same method as Example 1, except that 19% by weight of an inorganic filling material and 8% by weight of an antibacterial powder (3% by weight of a copper sulfide powder and 5% by weight of a red clay powder) were added in Example 1.

Comparative Example

Based on 100% by weight of a filling material, 5% by weight of polypropylene was added to a mixer and preheated at 200° ° C. for 10 minutes to melt polypropylene.

Then, 4% by weight of maleic anhydride and 10% by weight of a process oil (paraffin-based oil) were added to the molten polypropylene, stirred, and mixed to prepare a first mixture.

Thereafter, based on 100% by weight of a filling material, 28% by weight of styrene-ethylene-butadiene-styrene (SEBS), 5% by weight of polypropylene, 15% by weight of a process oil (paraffin-based oil), 27% by weight of calcium carbonate ($CaCO_3$), 3% by weight of a green masterbatch, 3% by weight of an anti-aging agent (TINUVIN405), and the first mixture were added to a mixer, mixed at 220° C., and subjected to extrusion at 220° C. by using an extruder. Simultaneously with the extrusion, the extruded mixture was cooled with air and cut into pieces in a size of a diameter of 1.4 to 3.35 mm to manufacture a filling material of a cylindrical shape for artificial turf.

Figure 1:
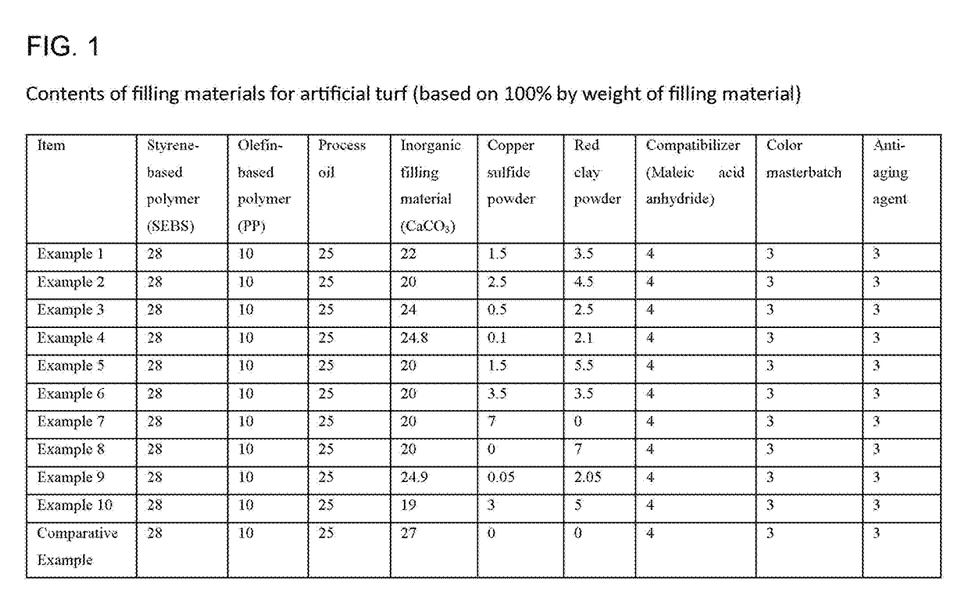
FIG. 1 is a table showing compositions of filling materials manufactured in Examples 1 to 10 and Comparative Example of the present invention.

The table of FIG. 1 shows compositions of filling materials manufactured in Examples 1 to 10 and Comparative Example.

Experimental Example 1

An artificial turf mat (pile length 55 mm) was filled with 25 kg/m² of silica sand by unit weight and 11 kg/m² of filling materials manufactured in Examples 1 to 10 and Comparative Examples in the order of silica sand and filling material, which were uniformly distributed so that the length from the top of a filling material to a tip of a pile yarn became 17 mm to manufacture an artificial turf system, and the specific heat, wear resistance, and shock absorption rate of filling materials were measured through the measurement methods described below, and the results are shown in Table 2 below.
[Measurement Methods]
Specific heat: Specific heat capacity was measured according to KS M ISO 11357-3 by using a differential scanning calorimeter (DSC).
Wear resistance (durability): After abrading each artificial turf system 20,000 times by using LISPORT stud abrasion equipment, the state of an outer appearance of a filling material was observed.
Wear resistance (shock absorption): After abrading each artificial turf system 20,000 times by using LISPORT stud abrasion equipment, the surface was evenly brushed and the shock absorption rate was measured.

Figure 2:
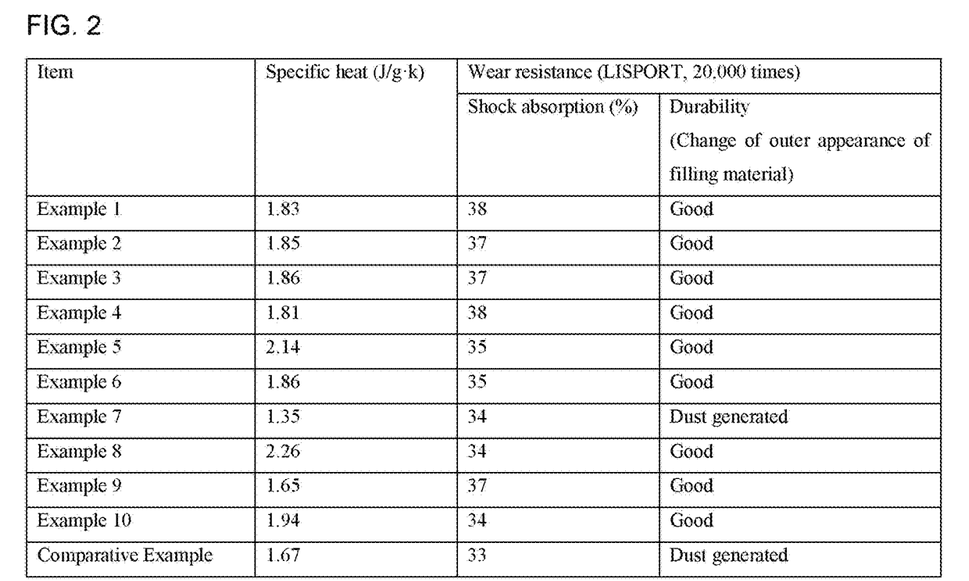
FIG. 2 is a table showing the results of a wear resistance test according to Examples of the present invention.

Referring to the table of FIG. 2, it is confirmed that when a red clay powder was included as an antibacterial powder (Examples 1 to 6 and Examples 8 to 10), no dust was generated, but when a red clay powder was not included (Example 7 and Comparative Example), dust was generated.

In addition, it is confirmed that when a red clay powder was included (Examples 1 to 6 and 8 to 10), the specific heat was 1.8 J/g·kg or more with excellent temperature-lowering efficacy, but when a red clay powder was not included (Example 7 and Comparative Example), the specific heat was less than 1.8 J/g·kg.

Experimental Example 2

Figure 3:
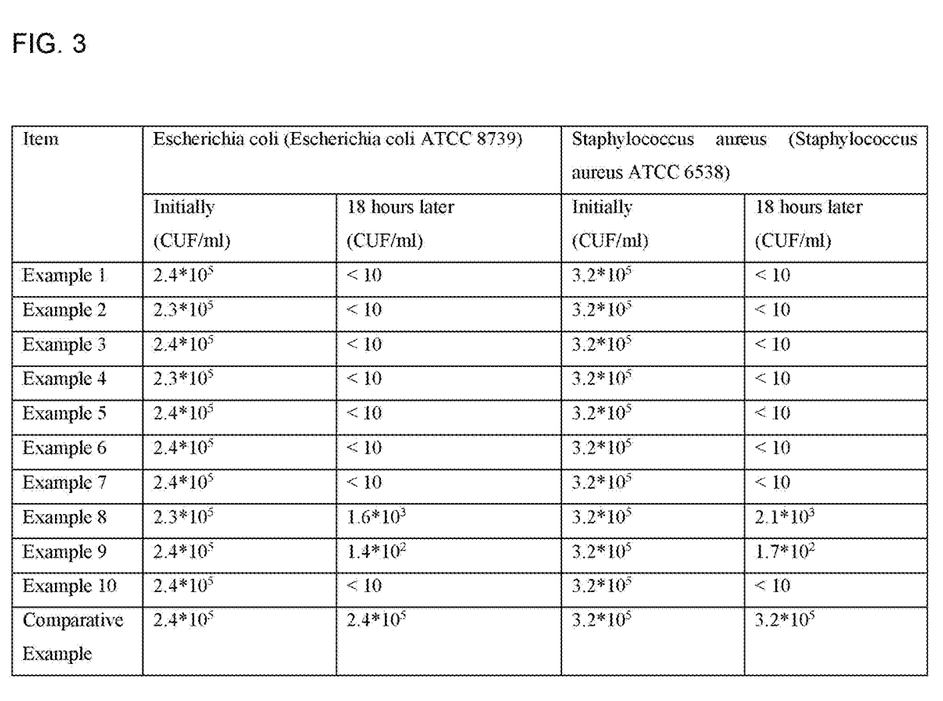
FIG. 3 is a table comparing an antibacterial effect between Examples of the present invention.
Figure 4:
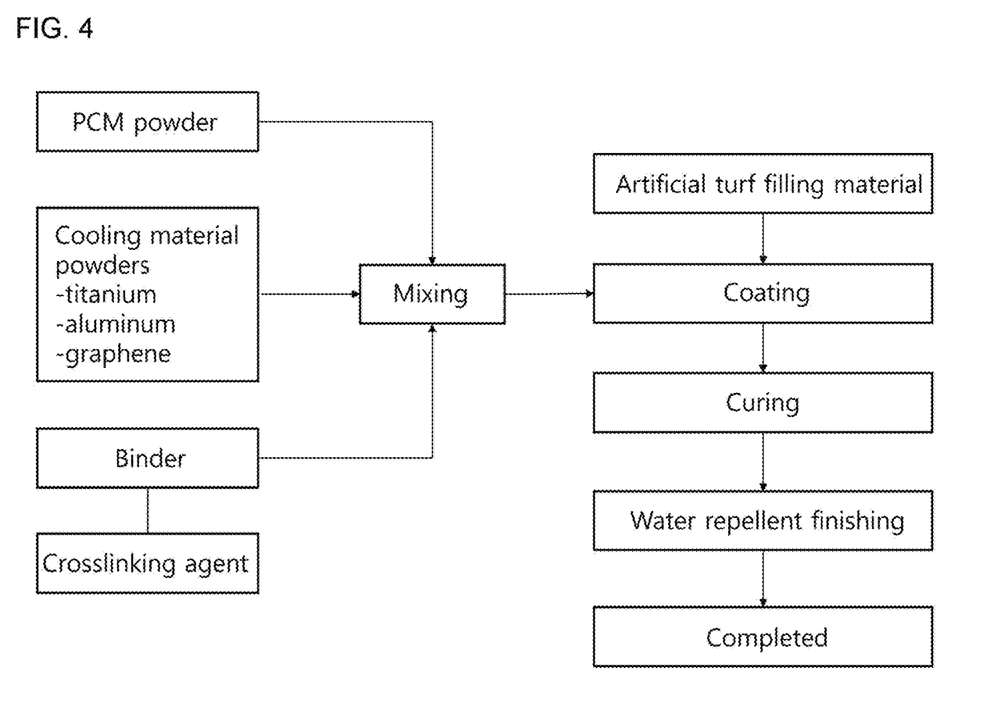
FIG. 4 is a diagram explaining a process for adding a cooling effect according to the present invention.
Figure 5:
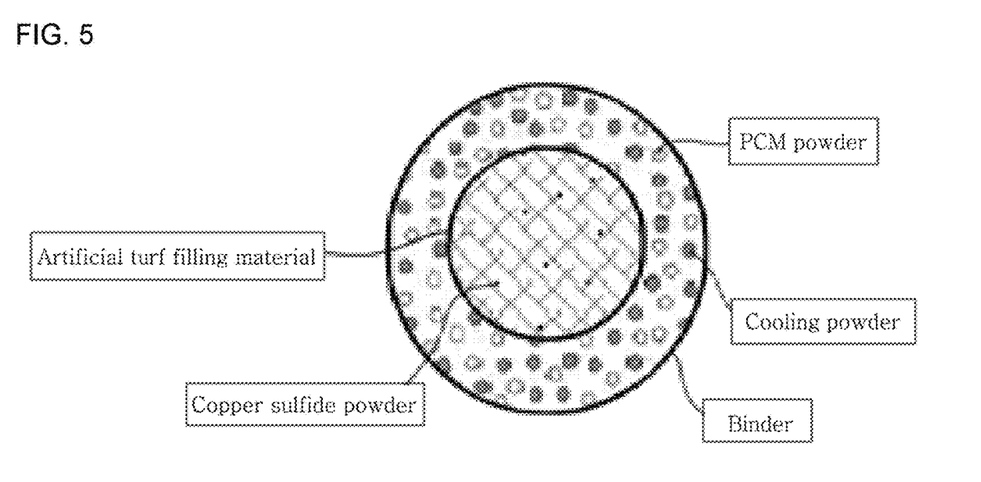
FIG. 5 is an exemplary diagram of a magnified cross-section of an artificial turf filling material according to the present invention.

To confirm an antibacterial effect of filing materials manufactured in Examples 1 to 10 and Comparative Example, measurement was performed by the measurement methods described below, and the results are shown in FIG. 3 below.
[Measurement Methods]
An aqueous solution containing *Escherichia coli* and *Staphylococcus aureus* was applied to 100 g of filling materials manufactured in Examples 1 to 10 and Comparative Example of the same shape, dried, and then subjected to measurement according to the test method of KS K 0693: 2001, which is an antibacterial test.

Referring to the table of FIG. 3, it is confirmed that an antibacterial effect was very excellent when an antibacterial powder was added (Examples 1 to 10) compared to when it was not added (Comparative Example).

In addition, it is confirmed that a better antibacterial efficacy was exhibited when a copper sulfide powder (Example 6) was mixed than when a red clay powder was used alone (Example 8).

In addition, it is confirmed that the antibacterial efficacy was very low when the content of copper sulfide in the total amount of a filling material was less than 0.1% by weight (Example 8), compared to the case where the content range was similar (0.1% by weight) (Example 4).

The present invention is manufactured to have antibacterial properties as described above, and then a cooling feature is provided by carrying out the following procedure to have cooling properties.

A PCM (phase change material) powder is prepared so that the particle size of the power may be 20 to 30 μm, and titanium, aluminum, and graphene powders are prepared so that the particle size of the powers may be 20 to 30 μm. After that, the three cooling powders may be used by mixing each with a binder or by mixing two or more powders, considering the advantages and disadvantages of each ingredient.

An eco-friendly acrylic binder is prepared as a binder to mix the PCM powder, titanium, aluminum, and graphene powder to have an appropriate viscosity and to be coated on the artificial turf filling material for proper adhesion. The reason why an acrylic binder is selected in the present invention because the present invention targets artificial turf filling materials having elasticity and so an elastic acrylic binder should be selected as a binder to maintain adhesion well during and after coating in response to stretching of artificial turf filling materials.

In addition, to increase fastness, an eco-friendly non-formalin type crosslinking agent (blocked-isocyanate; medium-temperature dissociation type) is mixed at a ratio of 3 to 5% based on the binder weight.

The prepared ingredients are mixed at ratios described below.

First, a binder comprising the eco-friendly non-formalin type crosslinking agent is prepared at 70% (all ratios hereinafter are in weight ratios), and PCM is mixed thereto at 30% to prepare a 100% base. The ratios of 70% and 30% above may be adjusted within a range of +10% each to obtain similar effects without departing from the gist of the invention.

A solution was completed by mixing a cooling power with the base at 20% of the weight of the base. In the present invention, find out an optimal mixing ratio of a cooling powder (titanium, aluminum, and graphene), 5%, 10%, and 20% were each mixed and tested.

As a specific example, a cooling power was each mixed at 5% (20 g), 10% (40 g), and 20% (80 g) with 400 g of the base to prepare solutions with different mixing ratios.

An outer surface of an artificial turf filling material is coated with the solution through a spraying machine.

After coating an artificial turf filling material, water-repellent finishing should be performed. Water-repellent finishing is necessary to prevent quick water permeation or contamination and penetration of foreign substances.

A coating was applied to an artificial turf filling material manufactured in the manner described above, and an experiment was performed about cooling performance. Experiments were performed by using three ingredients, which were aluminum, titanium, and graphene, and the results shown in the table of FIG. 6 were obtained.

Figure 6:
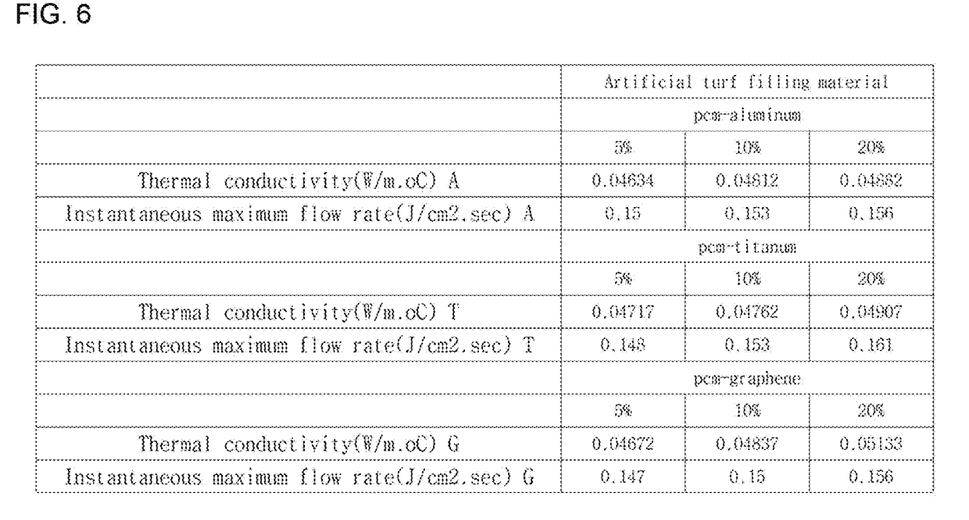
FIG. 6 is an experimental chart showing cooling performance of an artificial turf filling material according to the present invention.

As shown in the table of FIG. 6, thermal conductivity is the best when 20% of graphene is used as a cooling material, and an instantaneous maximum flow rate is the best when 20% of titanium is used as a cooling material.

According to the example described above, in addition to a cooling effect achieved by an existing PCM method, a cooling effect was further increased by comprising a power, such as titanium, having cold properties. A maximum effect was obtained by comprising titanium, aluminum, and graphene powders of appropriate ratios and mixing PCM power, titanium, aluminum, and graphene powders, and a binder at appropriate ratios.

In the present invention, a process described below may be added to enhance an antibacterial effect.

A capsule of nanoparticles comprising copper sulfide or copper oxide or a mixed powder thereof may be configured and the capsule of nanoparticles may be added to a solution in the coating process for imparting a cooling sensation so that in the coating process, the capsule of nanoparticles, together with the solution having a cooling effect, may be coated on an outer surface of an artificial turf filling material.

Through addition of this process, when an artificial turf filling material is used as an artificial turf, when a user's body or an exercise tool comes into contact with or gives an impact to the artificial turf filling material, the capsule of nanoparticles may be destroyed and thus an antibacterial ingredient may be released, resulting in long-term expression and maintenance of a uniform antibacterial effect.

What is claimed is:

1. An artificial turf filling material having antibacterial and cooling effects, comprising: an artificial turf filling material comprising 20 to 35% by weight of a styrene-based polymer, 8 to 20% by weight of an olefin-based resin, 15 to 30% by weight of a process oil, 10 to 30% by weight of an inorganic filling material, and 2.1 to 8% by weight of an antibacterial powder, wherein the antibacterial powder is a mixed powder of a copper sulfide powder and a red clay powder, wherein the artificial turf filling material has a specific heat of 1.80 J/g·k or more, wherein a PCM (phase change material) powder is prepared so that the particle size of the powder is 20 to 30 μm, and one or more of titanium, aluminum, and graphene powders are prepared as a cooling material powder, and wherein the one or more of the titanium, aluminum, and graphene powders are mixed with the PCM powder to form a solution with a binder having viscosity for adhesion, and the solution is supplied to a spraying machine to coat an outer surface of the artificial turf filling material to form the artificial turf filling material having antibacterial and cooling effects.

2. The artificial turf filling material having antibacterial and cooling effects according to claim 1, wherein the styrene-based polymer is one or more selected from the group consisting of styrene-ethylene-butadiene-styrene copolymer (SEBS), styrene-butadiene-styrene copolymer (SBS), styrene-ethylene-propylene-styrene copolymer (SEPS), hydrogenated styrene-isoprene-butadiene (SEEPS), and styrene-isoprene-styrene copolymer (SIS).

3. The artificial turf filling material having antibacterial and cooling effects according to claim 1, wherein the olefin-based polymer is an ethylene-based resin, a propylene-based resin, or a mixed resin thereof.

4. The artificial turf filling material having antibacterial and cooling effects according to claim 1, wherein the process oil is one or more selected from the group consisting of paraffin-based, naphthene-based, and aromatic-based process oils.

5. The artificial turf filling material having antibacterial and cooling effects according to claim 1, wherein the inorganic filling material is one or more selected from the group consisting of calcium carbonate, activated carbon, and mica.

6. The artificial turf filling material having antibacterial and cooling effects according to claim 1, wherein the mixed powder consists of 3 to 70% by weight of a copper powder and 30 to 97% by weight of a red clay powder.

7. The artificial turf filling material having antibacterial and cooling effects according to claim 1, wherein the PCM and the binder are in a weight ratio of 30% and 70%, which are adjustable by plus or minus 10%.

8. The artificial turf filling material having antibacterial and cooling effects according to claim 1, wherein a capsule of nanoparticles comprising copper sulfide or copper oxide or a mixed powder thereof is configured and the capsule of nanoparticles is added to the solution in the coating process for imparting a cooling sensation so that in the coating process, the capsule of nanoparticles, together with the solution having a cooling effect, is coated on the outer surface of the artificial turf filling material.

\* \* \* \* \*